United States Patent Office 3,651,228
Patented Mar. 21, 1972

3,651,228
17 - TERTIARY AMINOALKOXYIMINOANDRO-STANES FOR CONTROLLING PATHOGENIC FUNGI INFECTIONS
Wataru Nagata, Nishinomiya, and Haruo Nishimura, Ashiya, Japan, assignors to Shionogi & Co., Ltd., Higashi-ku, Osaka, Japan
No Drawing. Application Oct. 11, 1968, Ser. No. 766,944, now Patent No. 3,492,317, dated Jan. 27, 1970, which is a continuation-in-part of application Ser. No. 493,880, Oct. 7, 1965. Divided and this application Nov. 6, 1969, Ser. No. 871,257
Int. Cl. A61k 17/00
U.S. Cl. 424—238    4 Claims

ABSTRACT OF THE DISCLOSURE

17 - tertiary aminoalkoxyiminoandrostanes of the formula:

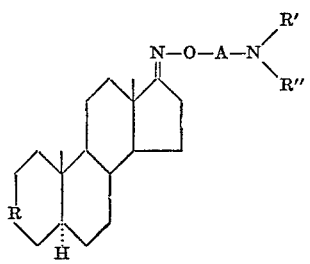

wherein A is alkylene having not more than five carbon atoms, R is methylene, hydroxymethylene, halogenomethylene or carbonyl, R' and R" are each alkyl having not more than three carbon atoms or, when taken together with the adjacent nitrogen atom, they represent a five- or six-membered saturated nitrogen-containing heterocyclic ring which is unsubstituted or substituted with alkyl having not more than three carbon atoms, and where a double bond can be present between the 2- and 3-positions, and salts thereof are useful as anti-fungal agents.

This application is a divisional application of application Ser. No. 766,944, filed Oct. 11, 1968 and now U.S. Pat. No. 3,492,317, which in turn is a continuation-in-part of application Ser. No. 493,880, filed Oct. 7, 1965 and now abandoned.

The present invention relates to certain steroids and to the production and use thereof. More particularly, it relates to certain 17-tertiary aminoalkoxyiminoandrostanes and their salts, and to the production and use thereof.

The said 17-tertiary aminoalkoxyiminoandrostanes are represented by the general formula:

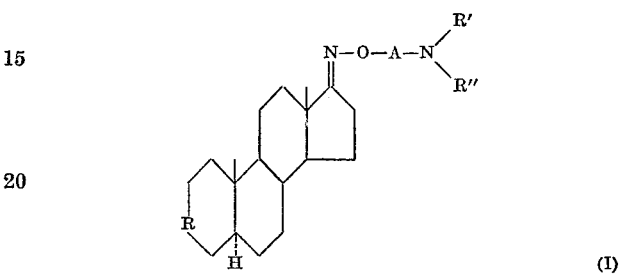

(I)

wherein A is an alkylene group having not more than five carbon atoms (e.g. methylene, ethylene, propylene, isopropylene, butylene), R is a methylene group, a hydroxymethylene group, a halogenomethylene group (e.g. chloromethylene, bromoethylene) or a carbonyl group, and each of R' and R" is an alkyl group having not more than three carbon atoms (e.g. methyl, ethyl, propyl), or, when taken together with the adjacent nitrogen atom, they represent a five- or six-membered saturated nitrogen-containing heterocyclic ring which is unsubstituted or substituted with an alkyl group having not more than three carbon atoms (e.g. methyl, ethyl, propyl), such as pyrrolidino, piperidino, piperazino, 4-methylpiperazino, morpholino or thiomorpholino, and wherein a double bond can be present between the 2- and 3-positions. Some typical compounds of the 17-tertiary aminoalkoxyiminoandrostanes of Formula I are as follows:

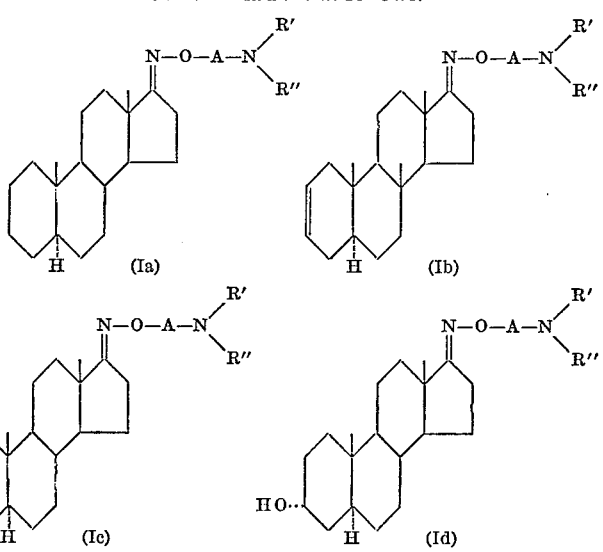

wherein each of A, R' and R" has the same significance as designated above. More specific examples of the 17-tertiary aminoalkoxyiminoandrostanes of Formula I are as follows:

17-(2-dimethylaminoethoxy)imino-5α-androstane,
17-(2-diethylaminoethoxy)imino-5α-androstane,
17-(3-dimethylaminopropoxy)imino-5α-androstane,
17-(3-piperidinopropoxy)imino-5α-androstane,
17-(2-dimethylaminoethoxy)imino-5α-2-androstane,
17-(2-diethylaminoethoxy)imino-5α-2-androstene,
17-(3-dimethylaminopropoxy)imino-5α-2-androstene,
17-(2-dimethylaminoethoxy)imino-5α-androstan-3α-ol,
17-dimethylaminomethoxyimino-5α-androstan-3β-ol,
17-(2-dimethylaminoethoxy)imino-5α-androstan-3β-ol,
17-(2-diethylaminoethoxy)imino-5α-androstan-3β-ol,
17-(2-dipropylaminoethoxy)imino-5α-androstan-3β-ol,
17-(2-pyrrolidinoethoxy)imino-5α-androstan-3β-ol,
17-(2-piperidinoethoxy)imino-5α-androstan-3β-ol,
17-(3-dimethylaminopropoxy)imino-5α-androstan-3β-ol,
17-(3-morpholinopropoxy)imino-5α-androstan-3β-ol,
17-dimethylaminomethoxyimino-5α-androstan-3-one,
17-(2-dimethylaminoethoxy)imino-5α-androstan-3-one,
17-(3-dimethylaminopropoxy)imino-5α-androstan-3-one,
3α-chloro-17-(2-dimethylaminoethoxy)imino-5α-androstane,
3α-chloro-17-(2-piperidinoethoxy)imino-5α-androstane,
3α-chloro-17-(3-dimethylaminopropoxy)imino-5α-androstane,
3α-chloro-17-(3-diethylaminopropoxy)imino-5α-androstane,
3α-chloro-17-(4-dimethylaminobutoxy)imino-5α-androstane, etc.

The said 17-tertiary aminoalkoxyiminoandrostanes of Formula I and their salts show anti-microbial activities. It is especially noted that one of the 17-tertiary aminoalkoxyiminoandrostanes of Formula I, 17-(2-dimethylaminoethoxy)imino-5α-androstane-3β-ol, exhibits a broader anti-fungal spectrum than the well-known anti-fungal agent griseofulvin, with the nearly equal level of potency to that of the latter. Thus, the 17-tertiary aminoalkoxyiminoandrostanes of Formula I and their salts are useful as anti-microbial agents, especially anti-fungal agents.

Accordingly, it is an object of the present invention to embody the 17-tertiary aminoalkoxyiminoandrostanes (I) and salts thereof. Another object of this invention is to embody the 17-tertiary aminoalkoxyiminoandrostanes (I) and salts thereof useful as anti-microbial agents, especially anti-fungal agents. Another object of the invention is to embody a process for preparing the 17-tertiary aminoalkoxyiminoandrostanes (I) and salts thereof. Another object of the invention is to embody a method for controlling infections caused by pathogenic microorganisms, especially pathogenic fungi, which comprises the administration of the 17-tertiary aminoalkoxyiminoandrostanes (I) or salts thereof. A further object of the invention is to embody a composition useful in treatment of the infections caused by pathogenic microorganisms, especially pathogenic fungi, which contains the 17-tertiary aminoalkoxyiminoandrostanes (I) or salts thereof as the active ingredient. These and other objects will be apparent to those conversant with the art to which the present invention pertains from the subsequent description.

The general procedure for the production of a 17-tertiary aminoalkoxyiminoandrostane (I) substantially comprises reacting the corresponding 17-hydroxyiminoandrostane with a secondary aminoalkyl halide represented by the general formula:

$$X-A-N\begin{matrix}R'\\R''\end{matrix}$$

wherein X is a halogen atom (e.g. chlorine, bromine, iodine) or a residue of sulfonic acid of the formula: R'''SO₃— in which R''' is a hydrocarbon residue (e.g. methyl, benzyl, tolyl), and A, R' and R" each has the same significance as designated above. Specific examples of the secondary aminoalkyl halides are as follows;

dimethylaminomethyl chloride,
dimethylaminomethyl bromide,
dimethylaminoethyl bromide,
dimethylaminoethyl iodide,
dimethylaminoethyl methanesulfonate,
dimethylaminoethyl p-toluenesulfonate,
dimethylaminoethyl phenylethanesulfonate,
dimethylaminopropyl chloride,
diethylaminopropyl bromide,
morpholinopropyl bromide,
piperidinopropyl bromide,
pyrrolidinoethyl chloride,
4-methylpiperazinopropyl iodide,
dimethylaminobutyl chloride,
diethylaminobutyl chloride,
dipropylaminomethyl chloride,
diisopropylaminoethyl bromide,
pyrrolidinopentyl bromide,
2-pyrrolidinobutyl bromide, etc.

The reaction can be carried out according to the so-called "Williamson Synthesis" or a modification thereof. When the symbol X represents a halogen atom, the 17-hydroxyiminoandrostane is treated with a metal salt-forming agent such as alkali hydroxide, alkali hydride, silver oxide, alkali metal, alkali alkoxide or the like in a water-free inert organic solvent (e.g. methanol, ethanol, benzene, toluene, dioxane, tetrahydrofuran) and then reacted with the secondary aminoalkyl halide. For completion of the reaction, there is normally required heating up to refluxing. In case the halogen atom represented by the symbol X is bromine or iodine, the reaction can proceed at a relatively low temperature in a short time. As the metal ion used for formation of the metal salt, potassium or sodium is preferred. If necessary, an iodic salt such as potassium iodide, or powdery copper may be added for promoting the reaction. When the symbol X represents a residue of sulfonic acid, the reactivity of the secondary aminoalkyl halide is relatively high so that the reaction may be effected not only in a water-free inert organic solvent but also in a water-containing inert organic solvent. Further, there may be used as the metal salt-forming agent alkali carbonate or metallic magnesium as well as the above-mentioned metallic compounds.

The production of the 17-tertiary aminoalkoxyimino-androstanes (I) may be accomplished in alternative procedures. One alternative procedure is that which is useful more especially for the preparation of the 17-tertiary aminoalkoxyiminoandrostane (Ie). Thus, this compound can be produced from the corresponding 3-hydroxyl compound (Ic) or (Id) by oxidizing the same, for instance, with chromic anhydride and acetic acid. Another alternative procedure is that employed more especially in the production of the 17-tertiary aminoalkoxyiminoandrostane (If). Thus, this compound can be obtained by reacting the corresponding 3β-hydroxyl compound (Ic), for instance, with toluenesulfonyl chloride in the presence of an organic base (e.g. pyridine, picoline, dimethylaniline, trimethylamino) and reacting the resulting 3 - toluenesulfonyloxy compound, for instance, with lithium chloride. A suitable procedure for production of each specific compound is determined in consideration of various factors such as availability of the starting compound and ease of the reaction operation.

The 17-tertiary aminoalkoxyiminoandrostanes (I) are obtained in crystalline or non-crystalline form. In the latter case, they can be converted into their organic or inorganic acid-addition or quaternary ammonium salts which are crystalline for convenience in separation and purification. Examples of the salts are hydrochloride, hydrobromide, hydroiodide, nitrate, thiocyanate, phosphate, tartrate, citrate, acetate, propionate, oxalate, salicylate, benzoate, picrate, methochloride, methobromide, methiodide, etc.

The thus prepared 17-tertiary aminoalkoxyiminoandrostanes of Formula I and their salts exhibit antimicrobial activity against some microorganisms, which is evidenced by the test results as shown below.

The antimicrobial activity was determined by the agar streak dilution method or by the tube dilution method. The following media were used: for bacteria, peptone-meat extract agar; for mycobacteria, Kirchner's medium with 10% human plasma; for fungi, glucose-Sabouraud's agar with 0.2% yeast extract; for Trichomonas vaginalis. glucose-peptone-yeast extract medium with 0.2% cysteine and 10% human plasma; for Tetrahymena gellei, peptone-yeast extract medium; and for Euglena gracillis, peptone-yeast extract with 0.2% sodium acetate. The minimal inhibitory concentration was recorded for each organism at the lowest concentration of compound at which there was no visible growth. Readings were recorded at the following times: 24 hours at 37° C. for bacteria, 48 hours at 28° C. for Aspergillus and Candida, 7 days at 28° C. for Trichophyton and Epidermophyton, 3 weeks at 37° C. for pathogenic mycobacteria, 4 days at 28° C. for Tetrahymena, 7 days at 20° C. in greenhouse for Euglena and 2 days at 37° C. for Trichomonas. The results are shown in Table I.

TABLE I.—ANTI-MICROBIAL ACTIVITY OF 17-TERTIARY AMINOALKOXYIMINOANDROSTANES

| Test organisms | Minimal inhibitory concentration (mcg./ml.) | | | | | | |
|---|---|---|---|---|---|---|---|
|  | I | II | III | IV | V | VI | VII |
| Bacteria: |  |  |  |  |  |  |  |
| Shigella dysenteriae | — | — | — | — | — | — | — |
| Shigella paradysenteriae Chara | — | — | — | — | — | — | — |
| Salmonella typhosa | — | — | — | — | — | — | — |
| Salmonella paratyphi A | — | — | — | — | — | — | — |
| Escherichia coli | — | — | — | — | — | — | — |
| Klebsiella pneumoniae | — | — | — | — | — | — | — |
| Bacillus subtilis PCI-219 | — | — | 10 | — | 5 | 10 | 10 |
| Bacillus anthracis | — | — | 5 | — | 10 | 10 | 10 |
| Staphylococcus aureus 209P | — | — | 10 | — | 10 | 10 | 10 |
| Sarcina lutea | — | — | 2 | — | 5 | 5 | 5 |
| Mycobacteria: |  |  |  |  |  |  |  |
| Mucobacierium tuberculosis, H37Rv | — | — | 5 | — | 10 | 10 | 5 |
| Fungi: |  |  |  |  |  |  |  |
| Aspergillus niger | — | — | — | — | — | — | — |
| Candida albicans M-9 | — | 10 | — | 10 | 50 | 20 | 20 |
| Trichophyton rubrum | 5 | 20 | 10 | 50 | 10 | — | — |
| Trichophyton mentagrophytes | 5 | 10 | 10 | 50 | 10 | 20 | 20 |
| Epidermophyton floccosum | 2 | 10 | 10 | 50 | 5 | — | — |
| Protozoa: |  |  |  |  |  |  |  |
| Trichomonas vaginalis RF | — | — | 50 | — | 50 | — | — |
| Tetrahymena gelei | 6.3 | 25 | 6.3 | 25 | 1.6 | ? | ? |
| Euglena gracillis | 1.6 | 6.3 | 6.3 | — | 3.2 | ? | ? |

Note.—(a) I, 17-(2-dimethylaminoethoxy)imino-5α-androstan-3β-ol. II, 17-(2-dimethylaminoethoxy)imino-5α-androstan-3-one hydrochloride. III, 17-(2-dimethylaminoethoxy)imino-5α-androstane hydrochloride. IV, 17-(2-dimethylaminoethoxy)imino-5α-androstan-3β-ol methiodide. V, 17-(2-dimethylaminoethoxy)imino-5α-2-androstene hydrochloride. VI, 3α-chloro-17-(2-dimethylaminoethoxy)imino-5α-androstane perchlorate. VII, 3α-chloro-17-(2-dimethylaminoethoxy)imino-5α-androstane hydrochloride. (b)—, inhibitory activity observed at a concentration of 50 mcg./ml. ? not done.

As shown in Table I, the 17-tertiary aminoalkoxyiminoandrostanes (I) exert antimicrobial activity on some Gram-positive bacteria, mycobacteria, fungi and protozoa. The activity of those compounds against dermatophytes is considerably high, 17-(2-dimethylaminoethoxy)imino-5α-androstan-3β-ol being the most active. Therefore, further antifungal tests were carried out with this most active compound according to the said test method. For comparison, a known antifungal antibiotic, griseofulvin was tested in the same system. The results are shown in Table II.

TABLE II.—COMPARISON OF IN VITRO ANTIFUNGAL-ACTIVITY OF 17-(2-DIMETHYLAMINOETHOXY)IMINO 5α-ANDROSTAN-3β-OL AND GRISEOFULVIN

| Test fungi | Minimal inhibitory concentration (mcg./ml.) | |
|---|---|---|
|  | 17-(2-dimethyl-aminoethoxy)imino-5α-androstan-3β-ol | Griseofulvin |
| Pathogenic fungi: |  |  |
| Trichophyton rubrum, T | 3.2 | 1.6 |
| Trichophyton rubrum | 3.2 | 1.6 |
| Trichophyton interdigitale | 1.6 | 1.6 |
| Trichophyton gypsum | 12.5 | 6.3 |
| Trichophyton ferrugineum | <0.8 | <0.8 |
| Trichophyton purpureum | 3.2 | 3.2 |
| Epidermophyton floccosum | <0.8 | <0.8 |
| Aspergillus niger | >50.0 | >50.0 |
| Pathogenic yeast-like fungi: |  |  |
| Torulopsis gropengieperi | 0.8 | >50.0 |
| Torulopsis aeria | 6.5 | >50.0 |
| Torulopsis famata | >50.0 | >50.0 |
| Debaryomyces kloeckeri | >50.0 | >50.0 |
| Candida ablicans | >50.0 | >50.0 |
| Phytopathogenic fungi: |  |  |
| Phytophtora infestans | <0.8 | >50.0 |
| Helminthosporium signoideum | 6.5 | >50.0 |
| Piricularia oryzae | 12.5 | >50.0 |
| Sclerotinia libertiana | >50.0 | >50.0 |
| Yeast: Saccaromyces cerevisiae | 3.2 | >50.0 |

As is seen in Table II, the anti-dermatophytes activity of 17 - (2 - dimethylaminoethoxy)imino - 5α - androstan-3β-ol is almost equal to that of Griseofulvin. Moreover, 17 - (2 - dimethylaminoethoxy)imino - 5α - androstan-3β-ol shows high fungistatic action against some strains of pathogenic yeast-like fungi and phytopathogenic fungi: the antifungal spectrum of 17(2-dimethylaminoethoxy)imino-5α-androstan-3β-ol is broader than that of Griseofulvin. Determination of the fungicidal activity of 17-(2- dimethylaminoethoxy)imino - 5α - androstan-3β-ol was accomplished by placing the compound in contact with cells of *Trichophyton mentagrophytes* in sterile saline solution. After the periods of contact, the cells were washed three times with sterile saline solution and subcultures were made at intervals by an inoculating loop on glucose-Sabouraud agar for growth observations. The results are shown in Table III.

TABLE III.—FUNGICIDAL ACTION OF 17-(2-DIMETHYL-AMINOETHOXY)IMINO-5α-ANDROSTAN-3β-OL AGAINST CELLS OF *TRICHOPHYTON MENTAGROPHYTES* SUSPENDED IN SALINE SOLUTION

| | Growth of trichophyton, concentration (mcg./ml.) | | | | | |
|---|---|---|---|---|---|---|
| | 1000 | 500 | 250 | 125 | 62.5 | Control |
| 24 | − | ++ | +++ | +++ | +++ | +++ |
| 48 | − | ++ | ++ | +++ | +++ | +++ |

NOTE.—(a) Subculture incubated at 37° C. Final readings made after 7 days. (b) Sterile saline solution used as the control. (c) —, no growth. +, ++ and +++, slight to full growth.

As listed in Table III, 17-(2-dimethylaminoethoxy)-imino - 5α - androstan-3β-ol has a remarkable fungicidal property against *Trichophyton mentagrophytes*.

Accordingly, the 17-tertiary aminoalkoxyiminoandrostanes (I) are useful as fungistatic and fungicidal agents, especially in the treatment of superficial mycoses due to Trichophyton. For instance, they can be used as externally applicable medicaments for controlling the infections caused by pathogenic Trichophyton such as *Trichophyton mentagrophytes*, *Trichophyton rubrum*, *Trichophyton tonsurans*, *Trichophyton epilans*, *Trichophyton sabourandi*, *Trichophyton schoenleini*, *Trichophyton concentricum*, *Trichophyton ferrugineum*, *Trichophyton violaceum* and *Trichophyton rosaceum* in the form of solutions, lotions, suspensions, emulsions, creams, ointments, liniments, pastes, jellies, powders and the like. In the preparation of these formulations, they may be incorporated into the widely used solvents such as water, ethanol, chloroform, glycerol, ether, propylene glycol, vegetable oils, essential oils, animal fats, beeswax, Vaseline, liquid paraffin silicone oil, polyethylene glycols, cetyl alcohol, stearyl alcohol, stearic acid, palmitic acid, sorbitol monostearate, glycerol tristearate, diethyleneglycol monostearate, lanolin and cholesterol, surfactants or emulsifiers such as sodium alginate, gum arabic, tragacanth, methyl cellulose, hydroxyethylcellulose, sodium carboxymethylcellulose, gelatin, glycerogelatin, pectin, triethanolamine oleate, sodium laurylsulfate, polyoxyethyleneglycol alkyl ethers or esters, polyoxyethylenesorbitol monofatty acid esters, soaps, hydroxystearine sulfate and alkylbenzenesulfonates, or other excipients such as talc, starch, magnesium stearate, aluminum stearate, zinc stearate, zinc oxide, magnesium oxide, kaolin bentonite, magnesium carbonate, precipitated calcium carbonate, silica, titanium oxide, resins, waxes, gummy substances, milk, sodium sulfate, sodium carbonate, sodium bicarbonate, boric acid, alum and other inorganic salts (e.g. phosphates, silicates) according to conventional procedures. In the formulations, the active compound of this invention may be included in a concentration of 0.005 to 10% by weight, preferably 0.01 to 5% by weight.

In this connection, it may be noted that the 5α- compounds (I) of the present invention show strong antidermatophytes activity as above, while the corresponding 5β-compounds have no such activity.

Practical and presently-preferred embodiments of the present invention are illustratively shown in the following examples. In these examples, "g." stands for gram(s) and "ml." stands for milliliter(s).

EXAMPLE 1

Preparation of 17-(2-dimethylaminoethoxy)imino-5α-2-androstene (Ib: A=(CH$_2$)$_2$; R'=R''=CH$_3$)

To a solution of 17-hydroxyimino-5α-androstane (2.0 g.) in anhydrous ethanol (60 ml.), there is added portionwise a mixture of N,N-dimethyl-2-chloroethylamine hydrochloride (1.99 g.) and 1.036 N sodium ethoxide (33.3 ml.) in 3 hours while stirring under reflux, and the resultant mixture is stirred for 2.5 hours. The reaction mixture is poured onto ice water and extracted with chloroform. The chloroform extract is washed with saturated sodium chloride solution, dried over anhydrous sodium sulfate and concentrated. The thus-obtained crude 17-(2-dimethylaminoethoxy)imino-5α-androstane (1.9 g.) is dissolved in anhydrous ether (25 ml.), hydrogen chloride gas passed through for 20 minutes and the precipitated crystals are collected by filtration. The crystals are recrystallized from a mixture of dichloromethane and acetone to give 17-(2-dimethylaminoethoxy)imino-5α-androstane hydrochloride (1.6 g.) as crystals melting at 225 to 228.5° C. $[\alpha]_D^{23.5}=+26.7\pm2°$ (c.=1.067, 1% ethanol-containing chloroform).

The starting 17-hydroxyimino - 5α - androstane is prepared by reacting 5α-androstan-17-one [A. Butenandt et al.: Z. Physiol. Chem., 229, 192 (1934)] with hydroxylamine in the presence of sodium acetate in aqueous ethanol.

EXAMPLE 2

Preparation of 17-(2-dimethylaminoethoxy)imino-5α-2-androstene (Ib: A=(CH$_2$)$_2$; R'=R''=CH$_3$)

To a solution of 17 - hydroxyimino-5α-2-androstene (2 g.) in anhydrous ethanol (60 ml.), there is added portionwise a mixture of N,N-dimethyl - 2 - chloroethylamine hydrochloride (2.4 g.) and 1.04 N sodium ethoxide (36 ml.) in 2.5 hours while stirring under reflux, and the resultant mixture is stirred for 2 hours. The reaction mixture is concentrated under reduced pressure, poured onto ice water and extracted with chloroform. The chloroform extract is washed with water, dried over anhydrous sodium sulfate and concentrated. The thus-obtained crude 17-(2-dimethylaminoethoxy)imino-5α-2-androstene (1.77 g.) is dissolved in a mixture of dichloromethane and ether (1:3), hydrogen chloride gas passed through while cooling with ice and the precipitated crystals are collected by filtration. The crystals are washed with anhydrous ether and recrystallized from a mixture of dichloromethane and ether to give 17-(2-dimethylaminoethoxy)imino-5α-2-androstene hydrochloride (1.82 g.) as crystals melting at 206 to 212° C. $[\alpha]_D^{24.5}=+61.1\pm2°$ (chloroform).

The starting 17-hydroxyimino-5α-2-androstene is prepared by reacting 5α-2-androsten-17-one (A. Bowers et al.: J. Med. Chem. 6, 156 (1963)] with hydroxylamine in the presence of sodium acetate in aqueous ethanol.

EXAMPLE 3

Preparation of 17-(3-piperidinopropoxy)imino-5α-androstan-3β-ol (Ic: A=(CH$_2$)$_3$; R'=R''=(CH$_2$)$_5$)

To a solution of 17-hydroxyimino-5α-androstan-3β-ol (1.22 g.) in anhydrous ethanol (36 ml.), there are added portionwise 1.04 N sodium ethoxide (20 ml.) and 1-piperidino-3-bromopropane hydrobromide (2.18 g.) in 2.5 hours while stirring under refluxing, and the resultant mixture is stirred for 4 hours. The reaction mixture is poured onto ice water and extracted with ether. The ether extract is washed with water, dried over anhydrous sodium sulfate and concentrated. The thus obtained crude 17-(3-piperidinopropoxy)imino-5α-androstan-3β-ol (2.14 g.) is dissolved in a mixture of dichloromethane and ether (1:3), hydrogen chloride gas passed through while cooling with ice and the precipitated crystals are collected by decantation. The crystals are washed with anhydrous ether and recrystallized from a mixture of methanol and ether to give 17-(3-piperidinopropoxy)imino-5α-androstan-3β-ol of hydrochloride (1.2 g.) as crystals melting at 239 to 248° C. $[\alpha]_D^{23}=+23.1\pm2°$ (chloroform). This salt is made alkaline with 2 N sodium carbonate solution and extracted with ether. The ether extract is washed with water, dried over anhydrous sodium sulfate and concentrated. The residue is crystallized from a mixture of methanol and ether, treated with active carbon and again crystallized from a mixture of methanol and ether to give 17-(3-piperidinopropoxy)imino-5α-androstan-3β-ol (1.0 g.) as needles melting at 124 to 126° C.

The starting 17-hydroxyimino-5α-androstan-3β-ol is prepared by reacting 3β-hydroxy-5α-androstan-17-one (T. Reichstein et al.: Helv. Chim. Acta, 24, 955 (1941)] with hydroxylamine in the presence of sodium acetate in aqueous ethanol.

EXAMPLE 4

Preparation of 17-(2-dimethylaminoethoxy)imino-5α-androstan-3β-ol (Ic: A=(CH$_2$)$_2$: R'=R''=CH$_3$)

To a solution of 17 - hydroxyimino-5α-androstan-3β-ol (5.3 g.) in anhydrous ethanol (160 ml.), there are added portionwise 1.04 N sodium ethoxide (101.6 ml.) and N,N-dimethyl-2-chloroethylamine hydrochloride (6 g.), and the resultant mixture is refluxed for 4 hours while stirring. The reaction mixture is poured onto ice water and extracted with ether. The ether extract is washed with water, ice-2 N hydrochloric acid and water in order. The acidic washing solution is made alkaline with potassium carbonate and extracted with chloroform. The chloroform extract is washed with water, dried over anhydrous sodium sulfate and the solvent evaporated. The residue is crystallized from a mixture of dichloromethane and acetone to give 17(2-dimethylaminoethoxy)imino-5α-androstan-3β-ol (3.9 g.) as crystals melting at 137.5 to 139.5 C. $[\alpha]_D^{24.5}=+33.1\pm2°$ (c.=0.985, chloroform).

This compound (200 mg.) is dissolved in anhydrous methanol (2 ml.) and methyl iodide (380 mg.) added thereto while cooling with ice. The resulting mixture is concentrated under reduced pressure. The residue is crystallized from methanol to give 17-(2-dimethylaminoethoxy)imino-5α-androstan-3β-ol methiodide (265 mg.) as crystals melting at 268 to 270.5° C. (decomp.). $[\alpha]_D^{23.5}=+23.8\pm2°$ (chloroform-methanol=1.1).

EXAMPLE 5

Preparation of 17-(2-dimethylaminoethoxy)imino-5α-androstan-3-one (Ie: A=(CH$_2$)$_2$; R'=R''=CH$_3$)

To a solution of 17-(2-dimethylaminoethoxy)imino-5α-androstan-3β-ol (1.8 g.) in acetic acid (17.8 ml.), there is added dropwise a solution of chromic anhydride (1.4 g.) in water (1.4 ml.) and acetic acid (14.2 ml.) while cooling with ice, and the resultant mixture is allowed to stand at room temperature for 3.5 hours. The reaction mixture is made alkaline with potassium carbonate, poured onto ice water and extracted with a mixture of ether and chloroform (3:1). The extract is washed with water, dried over anhydrous sodium sulfate and concentrated to dryness. The residue (1.5 g.) is dissolved in chloroform (10 ml.), combined with ether (20 ml.) and hydrogen chloride gas passed through while cooling with ice. The precipitated crystals are collected by filtration and recrystallized from a mixture of chloroform and ether to give 17-(2-dimethylaminoethoxy)imino - 5α - androstan-3-one hydrochloride (1.4 g.) as crystals melting at 217 to 222° C. $[\alpha]_D^{24}=+45.9\pm2°$ (c.=1.058, chloroform).

This compound can be also prepared by reacting 17-hydroxyimino-5α-androstan-3-one with N,N-dimethyl-2-chloroethylamine as in Example 4.

EXAMPLE 6

Preparation of 3α-chloro-17-(2-dimethylaminoethoxy)-imino-5α-androstane (If: A=(CH$_2$)$_2$; R'=R''=CH$_3$)

To a solution of 17-(2-dimethylaminoethoxy)imino-5α-androstan-3β-ol (2.1 g.) in anhydrous pyridine (21 ml.), there is added p-toluenesulfonyl chloride (3.17 g.) while cooling with ice, and the resultant mixture is allowed to stand at room temperature overnight. The reaction mixture is combined with ice, stirred for 2 hours, poured onto ice water and extracted with chloroform. The chloroform extract is washed with 2 N sodium carbonate solution and water in order, dried over anhydrous sodium sulfate and concentrated under reduced pressure. The thus-obtained 3-p-toluenesulfonyloxy compound (1.34 g.) is dissolved in anhydrous dioxane (84 ml.) while heating, lithium chloride (1.12 g.) added thereto and the resultant mixture refluxed for 15 hours. The reaction mixture is poured onto ice water and extracted with dichloromethane. The dichloromethane extract is washed with water, dried over anhydrous sodium sulfate and concentrated under reduced pressure. The residue (1.042 g.) is chromatographed on alumina (30 g.), dissolved in a mixture of dichloromethane and ether (1:3) and hydrogen chloride gas passed through to give 3α-chloro-17-(2-dimethylaminoethoxy)imino-5α-androstane hydrochloride (750 mg.) as crystals melting at 210 to 216° C. $[\alpha]_D^{26}=+39.8\pm2°$ (c.=1.0087, 1% ethanol-containing chloroform). The previously-obtained 3-p-toluenesulfonyloxy compound (1.2 g.) is reacted with lithium chloride as above and the resulting crude 3α - chloro-17-(2 - dimethylaminoethoxy)imino-5α-androstane treated with periodic acid to give the corresponding periodate (654 mg.) as crystals melting at 216 to 220° C. $[\alpha]_D^{26}=-34.6\pm2°$ (c.=1.0042, 1% ethanol-containing chloroform).

3α - chloro - 17 - (2 - dimethylaminoethoxy)imino-5α-androstane can be also prepared by reacting 3α-chloro-17-hydroxyimino-5α-androstane with N,N-dimethyl-2-chloroethylamine as in Example 4.

EXAMPLE 7

Preparation of 17 - (3 - morpholinopropoxy)-imino-5α-androstan-3β-ol (Ic: A=(CH$_2$)$_3$; R'+R'' =(CH$_2$)$_2$O(CH$_2$)$_2$)

To a solution of 17-hydroxyimino-5α-androstan-3β-ol (550 mg.) in anhydrous ethanol (16.5 ml.), there are added portionwise 1.0 N sodium ethoxide (2.0 ml.) and 1-morpholino-3-bromopropane hydrobromide (200 mg.) in the course of 2.5 hours while stirring under reflux, and the resultant mixture is stirred for 2.5 hours. The reaction mixture is poured onto ice water and extracted with ether. The ether extract is washed with water, dried over anhydrous sodium sulfate and concentrated under reduced pressure. The thus-obtained crude 17-(3-morpholinopropoxy)imino-5α-androstan-3β-ol (860 mg) is subjected to column chromatography using alumina (8 g.). The eluates with benzene and benzene:chloroform (4:1) are concentrated and recrystallized from a mixture of ether and petroleum ether to give pure crystals (580 mg.) melting at 112 to 113° C. $[\alpha]_D^{23}=+33.3\pm0.7°$ (c.=1.01, ethanol).

EXAMPLE 8

Composition containing 17-(2-dimethylaminoethoxy)-imino-5α-androstan-3β-ol as an active ingredient 25 kilograms of a topical cream for treating fungus infections of the skin or scalp are prepared from the following types and amounts of materials:

| | Grams |
|---|---|
| Stearic acid, N.F. | 5000 |
| Isopropyl myristate | 500 |
| 17 - (2-dimethylaminoethoxy)-imino-5α-androstan-3β-ol | 120 |
| Methylparaban, U.S.P. | 25 |
| Triethanolamine, U.S.P | 500 |
| Propylene glycol, U.S.P. | 2500 |
| Perfume, q.s. | |
| Deionized water, q.s. to 25,000 grams. | |

The stearic acid is melted and the isopropyl myristate mixed therein. The finely powdered 17-(2-dimethylaminoethoxy)-imino-5α-androstan-3β-ol is dissolved in part of the water at about 70° C., and the triethanolamine and propylene glycol are added to the aqueous solution. With constant stirring, the aqueous solution is combined with the 17 - (2-dimethylaminoethoxy)-imino-5α-androstan-3β-ol-isopropyl myristate mixture. The combination is stirred until the temperature reaches about 40° C. The perfume is added and any water loss replaced. Stirring is continued until congealing occurs. The cream is assayed for potency and filled into 5 g. tubes. The preparation is suitable for use in the treatment of moderately severe tinea barbae of the face or neck by direct application to infected areas of the skin twice a day.

EXAMPLE 9

Composition containing 17-(2-dimethylaminoethoxy)-imino-5α-androstan-3β-ol as an active ingredient A topical dusting powder suitable for the treatment of fungus infections on the foot or on other parts of the body is prepared from the following types and amounts of ingredients:

| | Grams |
|---|---|
| 17-(2-dimethylaminoethoxy)-imino - 5α - androstan-3β-ol (finely powdered, 200 mesh) | 20 |
| Zinc stearate | 350 |
| Bentonite | 630 |

Two applications of the powder per day to feet infected with moderately severe athlete's foot is a suitable course of treatment until symptoms subside.

Tinea barbae is a disease of the bearded parts of the mammal (human) face and of the neck caused by various species of Trichophyton and Microsporum; it is sometimes also called ringworm of the beard or trychophytosis barbae.

Athlete's foot is a fungus infection caused by species Trycophyton and Epidermophyton, and usually is manifested in the mammal (human) by skin disorder between the toes.

What is claimed is:

1. A method of controlling the infections caused by pathogenic fungi, which comprises the topical dosage administration to a mammal afflicted with a pathogenic fungal infection of a pharmaceutical preparation which comprises as an active ingredient an anti-fungally effective amount of a member selected from the group consisting of the 17-tertiary aminoalkoxyiminoandrostanes of the formula

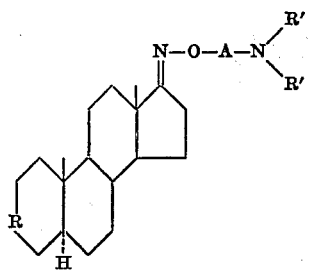

wherein A is alkylene having no more than five carbon atoms, R is a member selected from the group consisting of methylene, hydroxymethylene, halogenomethylene and carbonyl, R' and R" are each alkyl not more than three carbon atoms and, when taken together with the adjacent nitrogen atom they represent a member selected from the group consisting of five- and six-member saturated nitrogen-containing heterocyclic rings and their alkyl substituted rings wherein the alkyl group contains not more than three carbon atoms and corresponding Δ-2-androstenes, and pharmaceutically acceptable salts thereof.

2. The method according to claim 1, wherein the pathogenic fungi are pathogenic Trichophyton.

3. The method according to claim 1, wherein the pathogenic fungi are pathogenic Epidermophyton.

4. The method of claim 1 wherein the active ingredient is a member selected from the group consisting of 17-(2-dimethylaminoethoxy)imino-5α-androstan-3β-ol and salts thereof.

References Cited

UNITED STATES PATENTS

| 2,161,389 | 6/1939 | Ruzicka | 260—397 |
| 3,271,426 | 9/1966 | Villani | 260—397.5 |

OTHER REFERENCES

Nagata et al., Chem. Pharm. Bull., 14(2) 1966, pp. 174–186.

JEROME D. GOLDBERG, Primary Examiner

U.S. Cl. X.R.

424—241, 242